US005634352A

United States Patent [19]
Nagai et al.

[11] Patent Number: 5,634,352
[45] Date of Patent: Jun. 3, 1997

[54] REFRIGERATION CYCLE USING SIX-WAY CHANGE-OVER VALVE

[75] Inventors: Toshitake Nagai, Ojima-machi; Yonezo Ikumi, Tatebayashi; Takahide Kakinuma, Ota; Norio Sawada; Koji Sato, both of Oizumi-machi, all of Japan

[73] Assignee: Sanyo Electric Co., Ltd., Osaka, Japan

[21] Appl. No.: 447,676

[22] Filed: May 23, 1995

[30] Foreign Application Priority Data

May 31, 1994 [JP] Japan .................... 6-118931

[51] Int. Cl.$^6$ .................................. F25B 1/00
[52] U.S. Cl. .................... 62/324.6; 62/324.5; 62/278
[58] Field of Search .................. 62/324.6, 324.5, 62/528, 277, 278–324.1; 137/625.43

[56] References Cited

U.S. PATENT DOCUMENTS

| | | | |
|---|---|---|---|
| 3,411,538 | 11/1968 | Gruner et al. | 62/324.6 |
| 4,306,422 | 12/1981 | Korycki | 62/324.6 |
| 5,275,008 | 1/1994 | Song et al. | 62/81 |

FOREIGN PATENT DOCUMENTS 44346 4/1979 Japan .................... 62/324.6

*Primary Examiner*—William Doerrler
*Attorney, Agent, or Firm*—Darby & Darby

[57] ABSTRACT

A refrigeration cycle including a compressor, an indoor heat exchanger, an expansion, an outdoor heat exchanger and a six-way change-over valve having a refrigerant passage through which refrigerant flows in a refrigerant circuit comprising the compressor, the indoor heat exchanger, the expansion and the outdoor heat exchanger, wherein the six-way change-over valve serves to selectively switch the refrigerant passage so that the refrigerant passing in the indoor and outdoor heat exchangers flows in the same direction at any time when the refrigerant cycle is switched to a cooling operation cycle and to a heating operation cycle.

10 Claims, 12 Drawing Sheets

REFRIGERANT FLOW IN
ROOM HEATING OPERATION

REFRIGERANT FLOW IN
ROOM HEATING OPERATION

REFRIGERANT FLOW IN
ROOM COOLING OPERATION

COUNTERFLOW

PARALLEL-FLOW

CONDENSATION

VAPORIZATION

REFRIGERANT FLOW IN
ROOM HEATING OPERATION

REFRIGERANT FLOW IN
ROOM COOLING OPERATION

REFRIGERATION CYCLE USING SIX-WAY CHANGE-OVER VALVE

BACKGROUND OF THE INVENTION

1. Field of the Invention

The present invention relates to a refrigeration cycle using a six-way change-over valve, and particularly to a refrigeration cycle using a six-way change-over valve in which refrigerant can flow through indoor and outdoor heat exchangers in a fixed direction at any time.

2. Description of Related Art

A refrigerant circuit for use in a conventional air conditioner includes a compressor, a four-way change-over valve, a heat exchanger at an using side, an expansion device, a heat exchanger at a heat source side, etc. When a heating operation is carried out, refrigerant flows through the above elements in this order. On the other hand, when a cooling operation is carried out, the refrigerant flows through the above elements in the opposite direction to the above direction by switching the four-way change-over valve. Recently, an air conditioner using refrigerant (HFC type refrigerant) or substitute refrigerant such as non-azeotropic mixture refrigerant formed of refrigerant having high boiling point and refrigerant having low boiling point or the like, has been developed.

In the air condition using the non-azeotropic mixture refrigerant, the refrigerant having low boiling point is evaporated prior to evaporation of the refrigerant having high boiling point. Therefore, when the heat exchanger serves as an evaporator, temperature difference occurs between refrigerant inlet and outlet sides of a heat exchanger, so that the temperature at the inlet side of the heat exchanger becomes lower than that at the outlet side of the heat exchanger. On the other hand, when the heat exchanger serves as a condenser, the refrigerant having high boiling point is condensed prior to condensation of the refrigerant having low boiling temperature. Therefore, the temperature at the inlet side of the heat exchanger becomes higher than the temperature at the outlet side of the heat exchanger. Accordingly, when such non-azeotropic refrigerant is used in an air conditioner, it is efficiently preferable to design the refrigerant circuit so that the refrigerant and the air (or water) are forced to flow in opposite directions, that is, it is preferable to establish a counterflow relationship between the refrigerant flow and the air flow.

In general, refrigerant pipes are disposed in a multiple arrangement in the heat exchanger. That is, the refrigerant first flows through a pipe on the front face of the heat exchanger and then turns to and flows through a pipe on the back face thereof. Alternatively, the refrigerant first flows through a pipe on the back face of the heat exchanger and then turns to and flows through a pipe on the front face thereof. Accordingly, in order to improve the efficiency of the heat exchanger, the priority of the face of the heat exchanger on which the refrigerant first flows must be determined on the basis of the disposing position of the fan (i.e., the front face of the heat exchanger or the back face of the heat exchanger). The improvement of the efficiency as described above is applied to both cases where the refrigerant comprises HFC type refrigerant and where it comprises non-azeotropic mixture refrigerant.

However, when one of the heating operation and the cooling operation is selectively performed by switching the four-way change-over valve as described above, the refrigerant and the air (or water) necessarily flow in the same direction (in parallel to each other) either in the heating operation or in the cooling operation because the refrigerant flow direction in each of the heat exchanger at the user side and the heat exchanger at the heat source side is completely reversed between the heating operation and the cooling operation. Therefore, this conventional air conditioner has a problem that a coefficient of performance (COP) is reduced.

SUMMARY OF THE INVENTION

An object of the present invention is to provide an air conditioner in which refrigerant flowing in a heat exchanger at an user side and a heat exchanger at a heat source side is allowed to flow in the same direction both in a heating operation and in a cooling operation.

In order to attain the above object, according to a first aspect of the present invention, a refrigeration cycle is performed, comprises a compressor, an indoor heat exchanger, an expansion device, an outdoor heat exchanger and a six-way change-over valve having a refrigerant passage through which refrigerant flows among the compressor, the indoor heat exchanger, the expansion device and the outdoor heat exchanger, wherein the six-way change-over valve serves to selectively switch the refrigerant passage so that the refrigerant passing in the indoor and outdoor heat exchangers flows in the same direction at any times when the refrigerant cycle is switched to a cooling operation cycle and switched to a heating operation cycle.

In the refrigerant cycle as described above, the expansion device may comprise a first expansion device which is disposed at an outlet side of the indoor heat exchanger and serves to pass therethrough the refrigerant supplied from the indoor heat exchanger while reducing the pressure of the refrigerant in the heating operation cycle, and to directly pass therethrough the refrigerant supplied from the indoor heat exchanger without reducing the pressure of the refrigerant in the cooling operation cycle, and a second expansion device which is disposed at an outlet side of the outdoor heat exchanger and serves to pass therethrough the refrigerant supplied from the outdoor heat exchanger while reducing the pressure of the refrigerant in the room cooling operation cycle, and to directly pass therethrough the refrigerant supplied from the indoor heat exchanger without reducing the pressure of the refrigerant in the heating operation cycle.

In the refrigerant cycle as described above, the six-way change-over valve may comprise a valve housing having three inlet ports of first to third inlet ports and three outlet ports of first to third outlet ports, and a valve plug for selectively connecting any one inlet port to any one of two outlet ports.

The six-way change-over valve as described above may have at least one refrigerant passage through which the refrigerant flows substantially linearly.

In the refrigerant cycle as described above, the first to third inlet ports are connected to a discharge side of the compressor, an outlet side of the first pressure reducing unit and an outlet of the second pressure reducing unit respectively, and the first to third outlet ports are connected to an inlet side of the indoor heat exchanger, a vacuum side of the compressor and an inlet side of the outdoor heat exchanger respectively, thereby constituting the refrigerant cycle.

The refrigerant cycle as described above may further comprise a defrosting circuit containing an electromagnetic opening and closing valve which is connected between a discharge side of the compressor and an inlet side of the outdoor heat exchanger.

In the air conditioner as described above, the first reducing unit and/or the second reducing unit may comprise a capillary tube and an electromagnetic opening and closing valve which is provided in parallel to the capillary.

In the air conditioner as described above, at least the compressor, the outdoor heat exchanger and the six-way change-over valve may be accommodated in an outdoor side unit, and at least the indoor heat exchanger is accommodated in an indoor side unit.

According to a second aspect of the present invention, a refrigeration cycle having a compressor, an outdoor heat exchanger, an indoor heat exchanger, a first expansion device which is switchable between a validity state and a non-validity state for an expansion action, and a second expansion device which is switchable between a validity state and a non-validity state for an expansion action, comprises a six-way change-over valve which is provided with six ports from a first port to a sixth port, and can be selectively set to either a first state where the first port and the fourth port are allowed to intercommunicate with each other, the second port and the sixth port are allowed to intercommunicate with each other and the third port and the fifth port are allowed to intercommunicate with each other, or a second state where the first port and the sixth port are allowed to intercommunicate with each other, the second port and the fifth port are allowed to intercommunicate with each other, and the third port and the fourth port are allowed to intercommunicated with each other, a first refrigerant pipe for connecting a discharge port of the compressor to the first port of the valve, a second refrigerant pipe for connecting a vacuum port of the compressor to the fifth port of the valve, a third refrigerant pipe for connecting an inlet port of the outdoor heat exchanger to the fourth port of the valve, a fifth refrigerant pipe for connecting an outlet port of the outdoor heat exchanger through the first expansion device to the second port of the valve, a sixth refrigerant pipe for connecting an inlet port of the indoor heat exchanger to the sixth port of the valve, and a seventh refrigerant pipe for connecting an outlet port of the indoor heat exchanger through the second expansion device to the third port of the valve, wherein the six-way change-over valve is kept to the first state by setting the first expansion device to the validity state and setting the second expansion device to the non-validity state when a cooling operation is performed by the indoor heat exchanger, and kept to the second state by setting the first expansion device to the non-validity state and setting the second expansion device to the validity state when a heating operation is performed by indoor heat exchanger.

According to a third aspect of the present invention, a refrigeration cycle having a compressor, an outdoor heat exchanger, an indoor heat exchanger, a first expansion device which is switchable between a validity state and a non-validity state for an expansion action, and a second expansion device which is switchable between a validity state and a non-validity state for an expansion action, comprises a six-way change-over valve which is provided with six ports from a first port to a sixth port, and can be selectively set to either a first state where the first port and the sixth port are allowed to intercommunicate with each other, the second port and the fifth port are allowed to intercommunicate with each other and the third port and the fourth port are allowed to intercommunicate with each other, or a second state where the first port and the fourth port are allowed to intercommunicate with each other, the second port and the sixth port are allowed to intercommunicate with each other, and the third port and the fifth port are allowed to intercommunicated with each other, a first refrigerant pipe for connecting a discharge port of the compressor to the first port of the valve, a second refrigerant pipe for connecting a vacuum port of the compressor to the fifth port of the valve, a third refrigerant pipe for connecting an inlet port of the outdoor heat exchanger to the fourth port of the valve, a fifth refrigerant pipe for connecting an outlet port of the outdoor heat exchanger through the first expansion device to the second port of the valve, a sixth refrigerant pipe for connecting an inlet port of the indoor heat exchanger to the sixth port of the valve, and a seventh refrigerant pipe for connecting an outlet port of the indoor heat exchanger through the second expansion device to the third port of the valve, wherein the six-way change-over valve is kept to the first state by setting the first expansion device to the validity state and setting the second expansion device to the non-validity state when a cooling operation is performed by the indoor heat exchanger, and kept to the second state by setting the first expansion device to the non-validity state and setting the second expansion device to the validity state when a heating operation is performed by indoor heat exchanger

DETAILED DESCRIPTION OF THE PREFERRED EMBODIMENTS

Preferred embodiments according to the present invention will be described hereunder with reference to the accompanying drawings.

A first embodiment of an air conditioner using the present invention will be first described.

Figure 1:
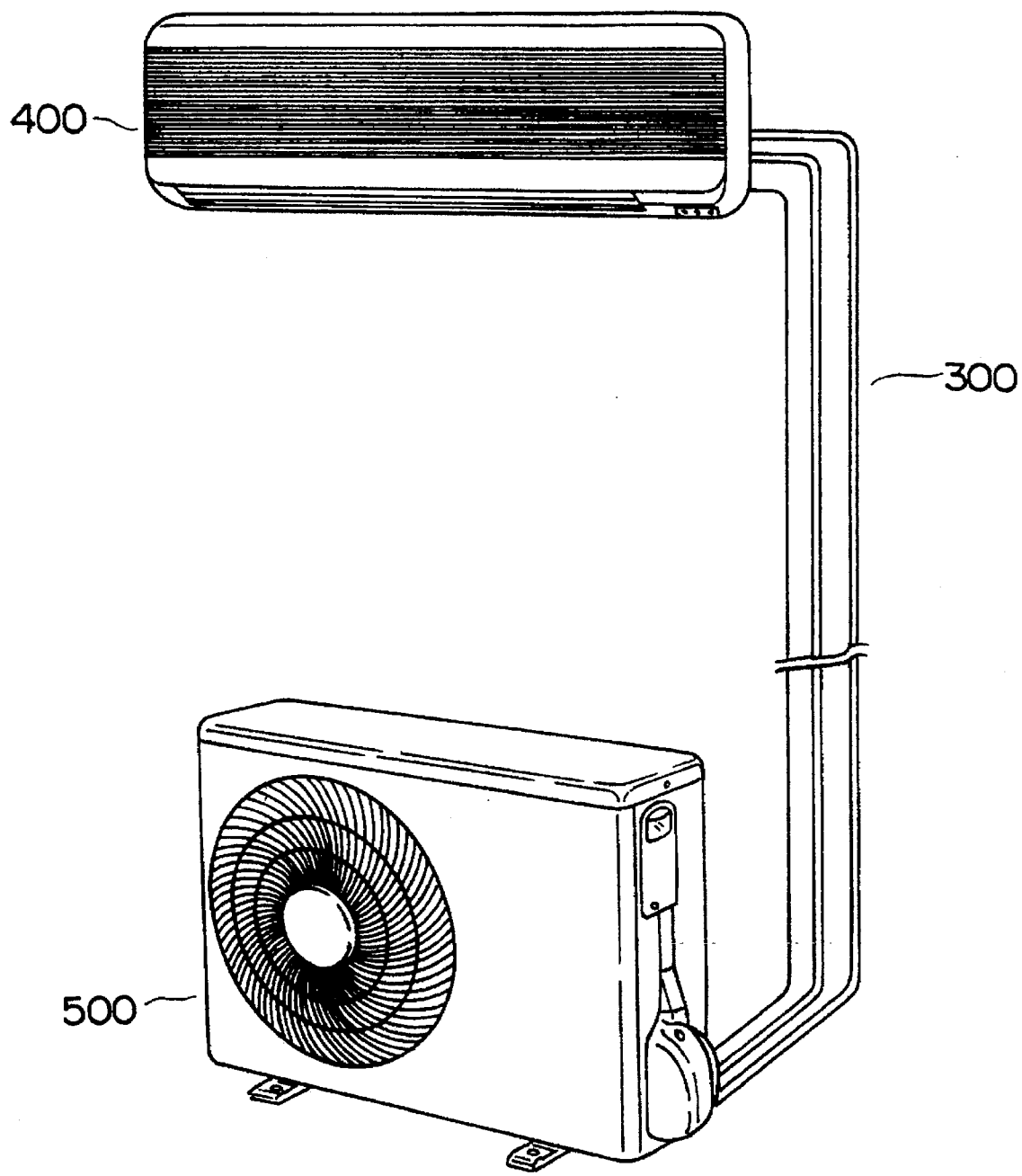
FIG. 1 is a perspective view showing the whole construction of an air conditioner using the present invention.

FIG. 1 is a perspective view showing a first embodiment of a general domestic air conditioner. This type of air conditioner includes a unit at a user side (hereinafter referred to as "indoor side unit") 400 which is disposed indoors, and a unit at a heat source side (hereinafter referred to as "outdoor side unit") 500 which is disposed outdoors, and both the indoor side unit 400 and the outdoor side unit 500 are connected to each other through refrigerant pipes 300.

Figure 2:
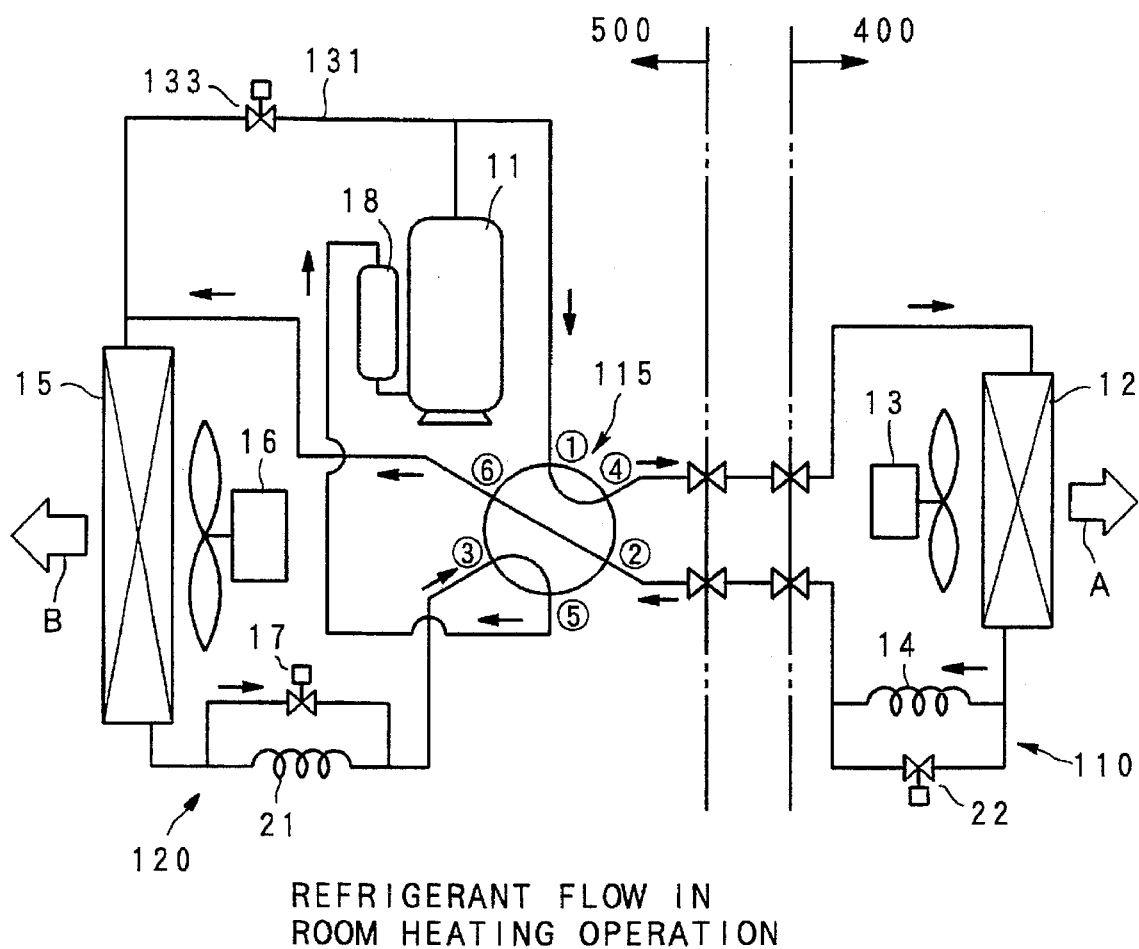
FIG. 2 is a diagram showing a refrigerant circuit of an embodiment of the present invention, particularly when a heating operation is carried out.
Figure 3:
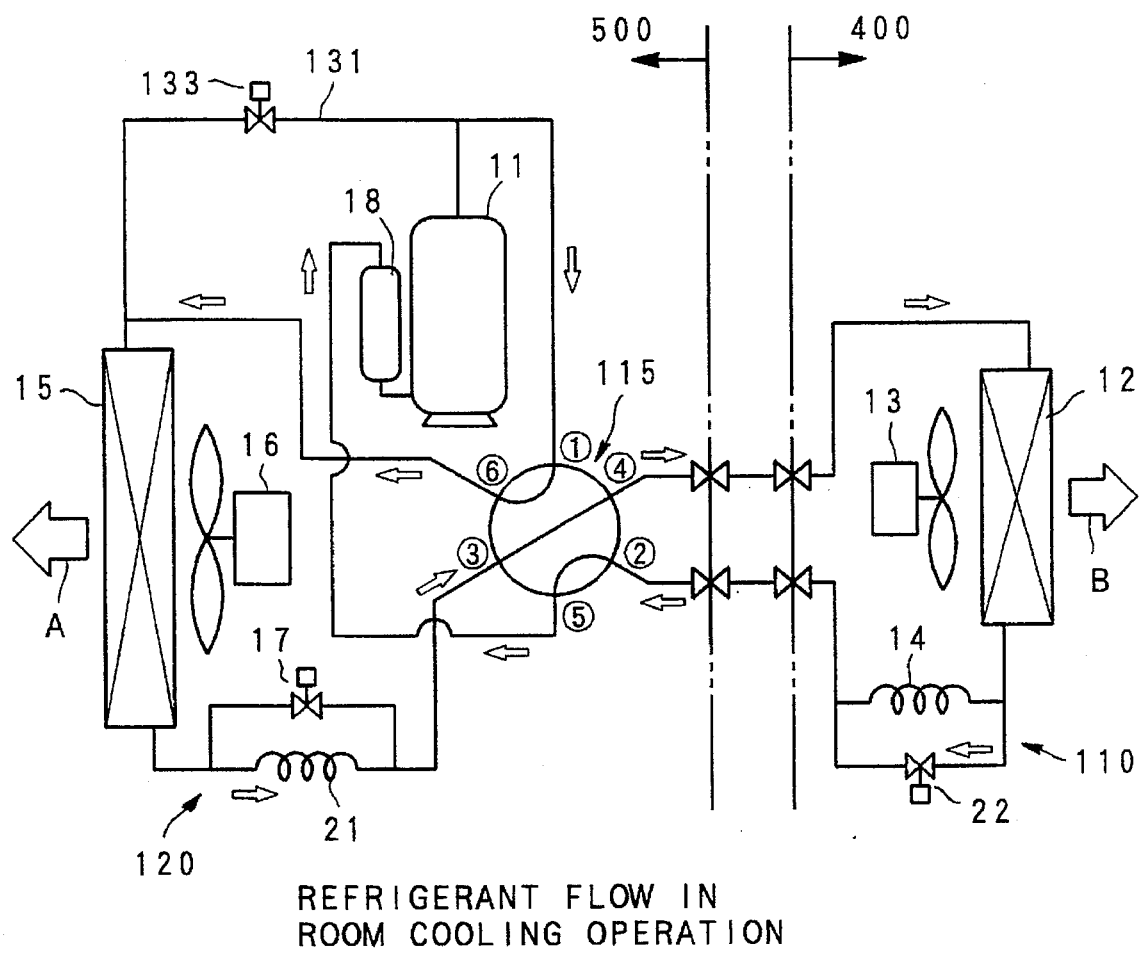
FIG. 3 is a diagram showing the refrigerant circuit the embodiment of the present invention, particularly when a cooling operation is carried out.

FIGS. 2 and 3 are refrigerant circuit diagrams for the air conditioner according to this embodiment for heating and cooling operations respectively. In FIGS. 2 and 3, the refrigerant circuit includes a compressor 11, a heat exchanger at a user side (hereinafter referred to as "indoor heat exchanger") 12, a fan at a user side (hereinafter referred to as "indoor fan") 13, a capillary tube 14, an electromagnetic opening and closing (switch) valve 22, a six-way change-over valve 115, a capillary tube 21, an electromagnetic opening and closing (switch) valve 17, a heat exchanger at a heat source side (hereinafter referred to as "outdoor heat exchanger") 15, a fan at a heat source side (hereinafter referred to as "outdoor fan") 16, and an accumulator 18. The refrigerant circuit further includes a defrosting circuit 131 containing an electromagnetic opening and closing valve 133, and it is connected between the compressor 11 and the outdoor heat exchanger 15.

In this embodiment, the six-way change-over valve 115 is provided in the refrigerant circuit, and the capillary tube 14 (21) is provided with the electromagnetic opening and closing valve 17 (22) in parallel to the capillary tube 14 (17). The capillary tube 14 and the electromagnetic opening and closing valve 22 constitute a first expansion device 110, and the capillary tube 21 and the electromagnetic opening and closing valve 17 constitute a second expansion device 120.

As shown in FIGS. 2 and 3, the six-way change-over valve 115 includes a valve housing 101 having three inlet ports (1), (2) and (3) and three outlet ports (4), (5) and (6), and a valve plug 102 (FIGS. 15 and 16) for selectively connecting one inlet port to two outlet ports. Furthermore, as shown in FIG. 2, the first inlet port (1) is connected to the discharge side of the compressor 11, the second inlet port (2) is connected to the outlet of the first expansion device 110 at the indoor side and the third inlet port (3) is connected to the outlet of the second expansion device 120 at the outdoor side. The first outlet port (4) is connected to the inlet of the indoor heat exchanger 12, the second outlet port (5) is connected to the vacuum side of the compressor 11 (accumulator 18), and the third outlet port (6) is connected to the inlet side of the outdoor heat exchanger 15.

Figure 4:
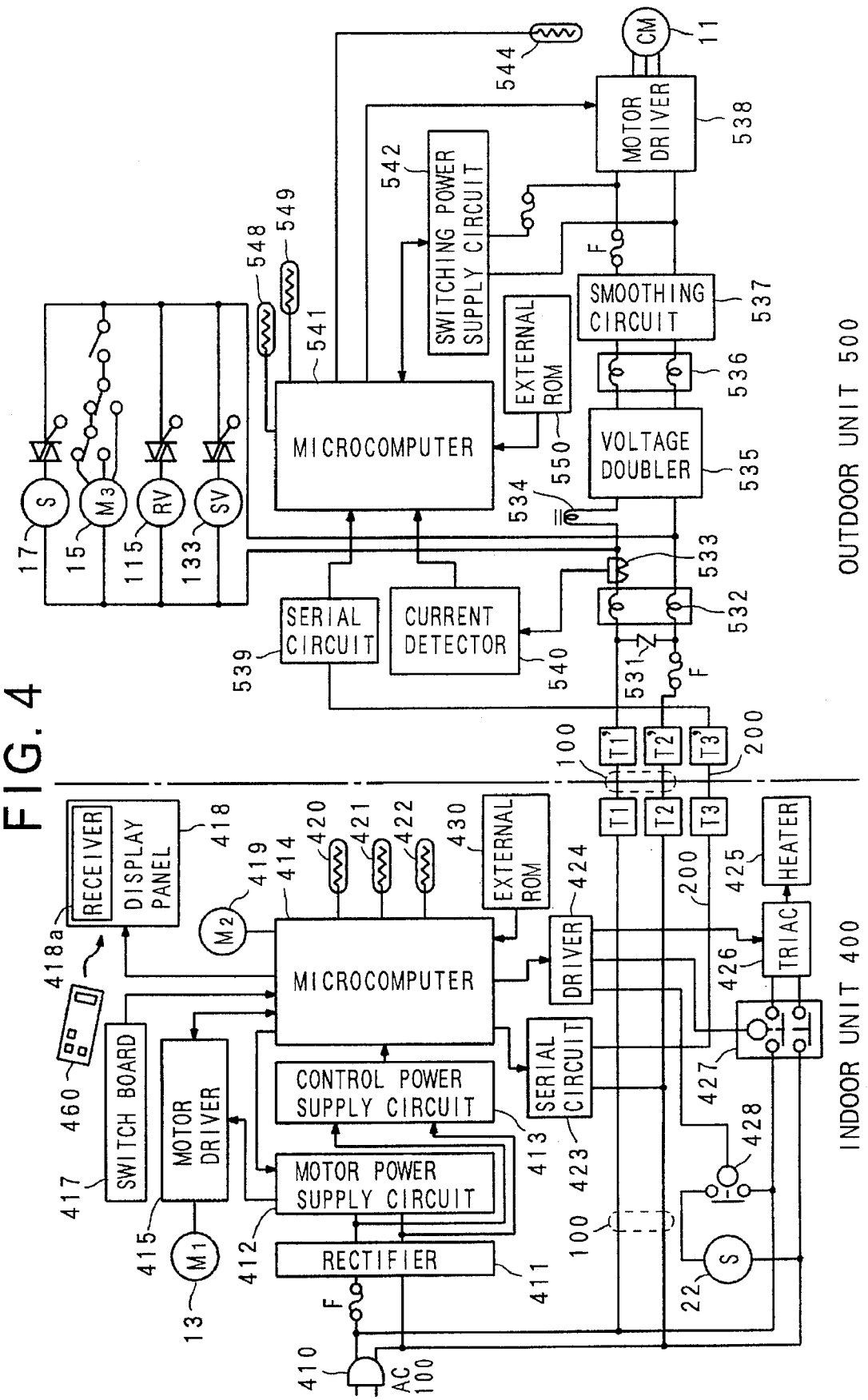
FIG. 4 is a block diagram for a control system of the air conditioner using the present invention.

FIG. 4 is a block diagram showing a control circuit for the air conditioner to which this invention is applied. A half circuit portion located at the left side of the one-dotted chain line drawn in the middle of FIG. 4 corresponds to a control circuit arranged in the indoor side unit 400, and the other half circuit portion located at the right side corresponds to a control circuit arranged in the outdoor side unit 500. The two control circuits are connected to each other through power lines 100 and a communication (control) line 200.

The control circuit in the indoor side unit 400 comprises a rectifier 411, a power supply circuit 412 for motors, a power supply circuit 13 for a control operation, a motor driver 415, a fan motor 13, a switch board 417, a receiver 418a, a display panel 418, and a flap motor ($M_2$) 419.

The rectifier 411 rectifiers an AC voltage of 100 [V] which is applied through a plug 410a. The power supply circuit 412 for motors adjusts a DC voltage applied to a DC fan motor (brushless motor)($M_1$) 13 to a voltage of 10 to 36 [V] in accordance with a signal from a microcomputer 414. The DC fan motor serves to blow out cool air or warm air into a room to be air-conditioned, The power supply circuit 413 generates a DC voltage of 5 [V] to be applied to the microcomputer 414. The motor driver 415 controls the energization (current supply) timing of the stator winding of the DC fan motor 13 in response to a signal from the microcomputer 414, which is based on rotational position information on the DC fan motor 13. The switch board 417 is fixedly mounted on an operation panel for the indoor side unit 400. An ON/OFF switch, a test run switch and the like are arranged on the switch board 417. The receiver 418a receives a remote operation signal (e.g., an ON/OFF signal, a cooling/heating switching signal, or a room temperature setting signal) from a wireless remote controller 460. The display panel 418 displays an operation status of the air conditioner. The flap motor 419 serves to move flaps for changing the blowing direction of cool/warm air.

In addition, the control circuit includes a room temperature sensor 420 for detecting the room temperature, a heat exchanger temperature sensor 421 for detecting the temperature of the indoor heat exchanger, and a humidity sensor 422 for detecting the room humidity. Those detection values which have been obtained by these sensors are A/D-converted and taken into the microcomputer 414. A control signal from the microcomputer 414 is transmitted to the outdoor side unit 500 through a serial circuit 423 and a terminal board $T_3$. In addition, a triac 426 and a heater relay 427 are controlled by the microcomputer 414 through a driver 424, thereby stepwisely controlling power which is supplied to a re-heating heater 425 used for a drying operation. A relay 428 is controlled by the microcomputer 414 through the driver 424, thereby stepwisely controlling power which is supplied to the valve 22.

Reference numeral 430 represents an external ROM for storing specific data which specify the type and characteristics of the air conditioner. These specific data are taken out from the external ROM 430 immediately after the power supply switch is turned on and an operation is stopped. When the power supply switch is turned on, input of a command from the wireless remote controller 460 or detection of the status of the ON/OFF switch or the test run switch (whose operations will be described later) are not performed until the specific data have been completely taken out from the external ROM 430.

The control circuit for the outdoor side unit 500 will be next described.

In the outdoor side unit 500, terminal boards $T'_1$, $T'_2$ and $T'_3$ are respectively connected to terminal boards $T_1$, $T_2$ and $T_3$ arranged in the indoor side unit 400. Reference numeral 531 represents a varistor which is connected in parallel to the terminal boards $T'_1$ and $T'_2$; 532, a noise filter; 534, a reactor; 535, a voltage double rectifier for doubling a voltage; 536, a noise filter; and 537, a smoothing circuit (ripple filter) for obtaining a DC voltage of about 280 [V] from an AC voltage of 100 [V].

Reference numeral 539 represents a serial circuit for performing signal conversion of a control signal supplied from the indoor side unit 400 through the terminal board T$_3$ and transmitting the converted signal to a microcomputer 541. Reference numeral 540 represents a current detector for detecting a current supplied to a load in a current transformer (CT) 533 of the outdoor side unit 500 to smooth the current to a DC voltage and supply the DC voltage to the microcomputer 541; 542, a switching power supply circuit for generating a power supply voltage for the microcomputer 541; and 538, a motor driver having six power transistors for performing PWM control of power supplied to a compressor motor 543 (to be described later) on the basis of a control signal from the microcomputer 541.

The six power transistors of the motor driver 538 are connected in the form of a three-phase bridge, thus constituting a so-called inverter unit. Reference numeral 11 represents a compressor for the refrigeration cycle; 544, a discharge temperature sensor for detecting the temperature of the refrigerant on the discharge side of the compressor; and 15, a fan motor which is controlled in its speed at three steps and serves to send air to the outdoor heat exchanger. As described above, the six-way change-over valve 115 and the electromagnetic opening and closing valves 17 serve to switch the refrigerant passages of the refrigerant in the refrigeration cycle.

Further, in the outdoor side unit 500, an outdoor temperature sensor 548 for detecting an outdoor temperature is arranged in the vicinity of the air intake port, and an outdoor heat exchanger temperature sensor 549 for detecting the temperature of the outdoor heat exchanger is arranged. Detection values obtained by these sensors 548 and 549 are A/D-converted and taken into the microcomputer 541.

Reference numeral 550 represents an external ROM having the same function as that of the external ROM 430 in the indoor side unit 400. The inherent data about the outdoor side unit 500, which are similar to those described with reference to the external ROM 430, are stored in the ROM 550. Reference symbol F in each of the control circuits of the indoor side unit 400 and the outdoor side unit 500 represents a fuse.

Each of the microcomputers (control elements) 414 and 541 is designed such that a ROM storing programs in advance, a RAM storing reference data and a CPU for executing the programs are housed in the same package (87C196MC (MCS-96 series) available from Intel Corporation).

The operation of the air conditioner thus constructed will be described hereunder with reference to FIGS. 2 and 3.

FIG. 2 shows the refrigerant flow in the refrigerant circuit during the heating operation for the room to be heated, and FIG. 3 shows the refrigerant flow in the refrigerant circuit during the cooling operation for the room.

In the heating operation, the refrigerant flows through the ports (1) and (4) of the six-way change-over valve into the indoor heat exchanger 12 as indicated by arrows. At this time, the indoor heat exchanger 12 serves as a condenser, and thus it takes a heat-radiating action. Therefore, warm air A is blown out to the indoor side by blowing the air through the indoor fan 13. The refrigerant passing through the indoor heat exchanger 12 is passed through the capillary tube 14 because the electromagnetic opening and closing valve 22 is closed, so that its pressure is reduced. Thereafter, the pressure-reduced refrigerant is supplied into the six-way change-over valve 115, and flows through the ports (2) and (6) of the six-way change-over valve 115 into the outdoor heat exchanger 15.

In this case, the outdoor heat exchanger 15 serves as an evaporator, and thus it takes endothermic action. Therefore, cooled air B is discharged to the outdoor side by blowing the air through the outdoor fan 16. The refrigerant passing through the outdoor heat exchanger 15 is passed through the electromagnetic opening and closing valve 17 with no resistance because the electromagnetic opening and closing valve 17 is opened, and then enters the six-way change-over valve 115. Thereafter, the refrigerant is passed through the ports (3) and (5) of the six-way change-over valve 17 into the accumulator 18, and returned to the compressor 11.

In the cooling operation, the refrigerant which is compressed in the compressor 11 first flows into the outdoor heat exchanger 15 through the ports (1) and (6) of the six-way change-way valve 115 as indicated by arrows. At this time, the outdoor heat exchanger 15 acts as a condenser and thus it takes the heat radiating action. Therefore, the warm air A is discharged to the outdoor side by blowing the air through the outdoor fan 16. Since the electromagnetic opening and closing valve 17 is closed, the refrigerant passing through the outdoor heat exchanger 15 is passed through the capillary tube 21 so that its pressure is reduced. Thereafter, the pressure-reduced refrigerant enters the six-way change-over valve 115, and then flows into the indoor heat exchanger 12 through the ports (3) and (4) of the six-way change-over valve 115.

At this time, the indoor heat exchanger acts as an evaporator, and thus it takes the endothermic action. Therefore, the cool air B is discharged to the indoor side by blowing the air through the indoor fan 13. Since the electromagnetic opening and closing valve 22 is opened, the refrigerant passing through the indoor heat exchanger 12 is passed through the electromagnetic opening and closing valve 22 with no resistance, enters the six-way change-over valve 115, and then is returned to the accumulator 18 and the compressor 11 through the ports (2) and (5) of the six-way change-over valve 115.

According to the air conditioner thus constructed, it is apparent from FIGS. 2 and 3 that the refrigerant flows through each of the indoor heat exchanger 12 and the outdoor heat exchanger 15 in the same direction both in the room cooling operation and in the room heating operation. Accordingly, if the refrigerant flow and the air flow are set to be mutually counterflow to each other in both the heat exchangers 12 and 15 as described later, this counterflow relationship can be kept to be established at all times (i.e., in both the room cooling operation and the heating operation).

In this embodiment, substitute refrigerant such as non-azeotropic mixture refrigerant formed of refrigerant having high boiling point and refrigerant having low boiling point is used as the refrigerant passing in the refrigerant circuit. In the non-azeotropic mixture refrigerant, the refrigerant having low boiling point is evaporated prior to the refrigerant having high boiling point. Therefore, when the heat exchanger acts as an evaporator, temperature variation occurs between the inlet and outlet sides of the heat exchanger, and the temperature at the inlet side of the heat exchanger becomes lower than that at the outlet side. On the other hand, when the heat exchanger acts as a condenser, the refrigerant having high boiling point is condensed prior to the refrigerant having low boiling point, and the temperature at the inlet side of the heat exchanger becomes higher than that at the outlet side. When such non-azeotropic mixture refrigerant is used, it is efficiently preferable to establish the counterflow relationship between the refrigerant flow and the air flow (water flow) in the heat exchanger.

Figure 5:
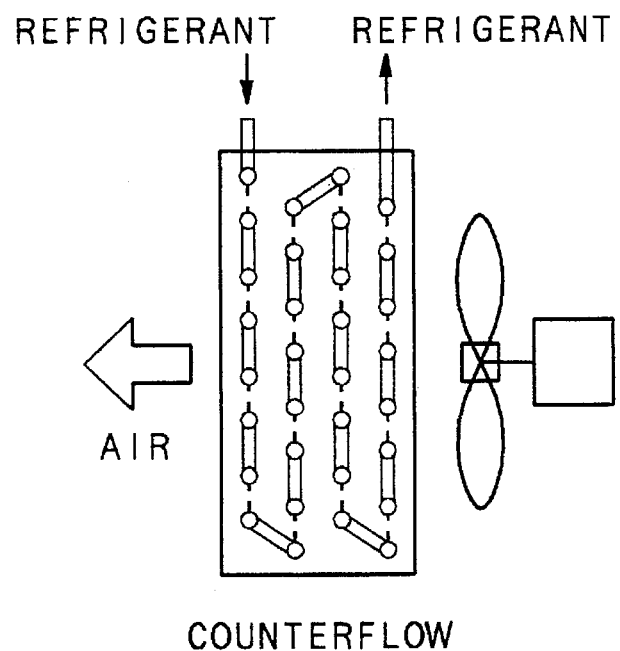
FIG. 5 is a schematic diagram showing a counter-flow air type heat exchanger.
Figure 6:
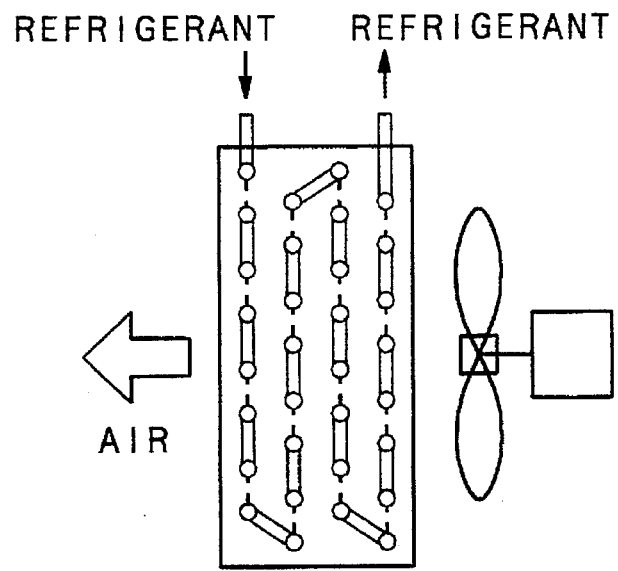
FIG. 6 is a schematic diagram showing a parallel-flow air type heat exchanger.

FIG. 5 shows a counterflow type heat exchanger, and FIG. 6 shows a parallel-flow type heat exchanger. In the counterflow type heat exchanger as shown in FIG. 5, refrigerant and air are forced to flow in the opposite directions, that is, the counterflow relationship is established between the refrigerant flow and the air flow. On the other hand, in the parallel-flow type heat exchanger as shown in FIG. 6, refrigerant and air are enforced to flow in the same (parallel) direction, that is, the parallel-flow relationship is established between the refrigerant flow and the air flow.

Figure 7:
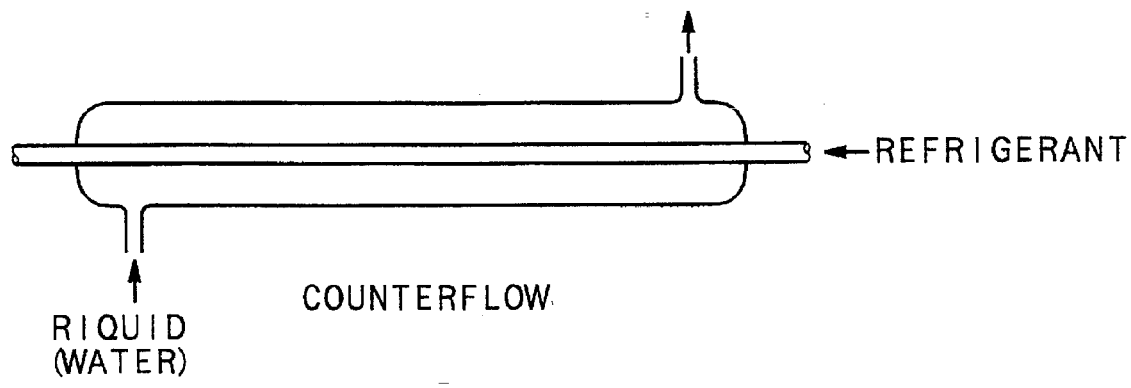
FIG. 7 is a diagram showing a counter-flow water type heat exchanger.
Figure 8:
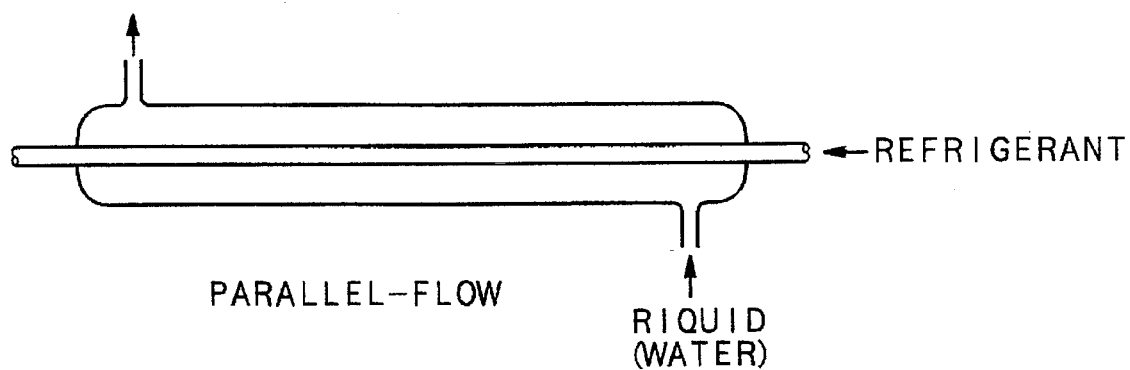
FIG. 8 is a diagram showing a parallel-flow water type heat exchanger.

FIG. 7 shows a water-type counterflow heat exchanger, and FIG. 8 shows a water-type parallel-flow heat exchanger. In the water-type counterflow heat exchanger as shown in FIG. 7, refrigerant and water are forced to flow in the opposite directions, that is, the counterflow relationship is established between the refrigerant flow and the water flow. On the other hand, in the water-type parallel-flow heat exchanger as shown in FIG. 8, refrigerant and water are forced to flow in the same (parallel) direction, that is, the parallel-flow relationship is established between the refrigerant flow and the water flow. FIGS. 9 to 12 show experimental results when the water-type heat exchangers shown in FIGS. 7 and 8 were actually used. In this experiment, refrigerant whose mixing rate of HFC-32/125/134 was 30%/10%/60% was used.

Figure 9:
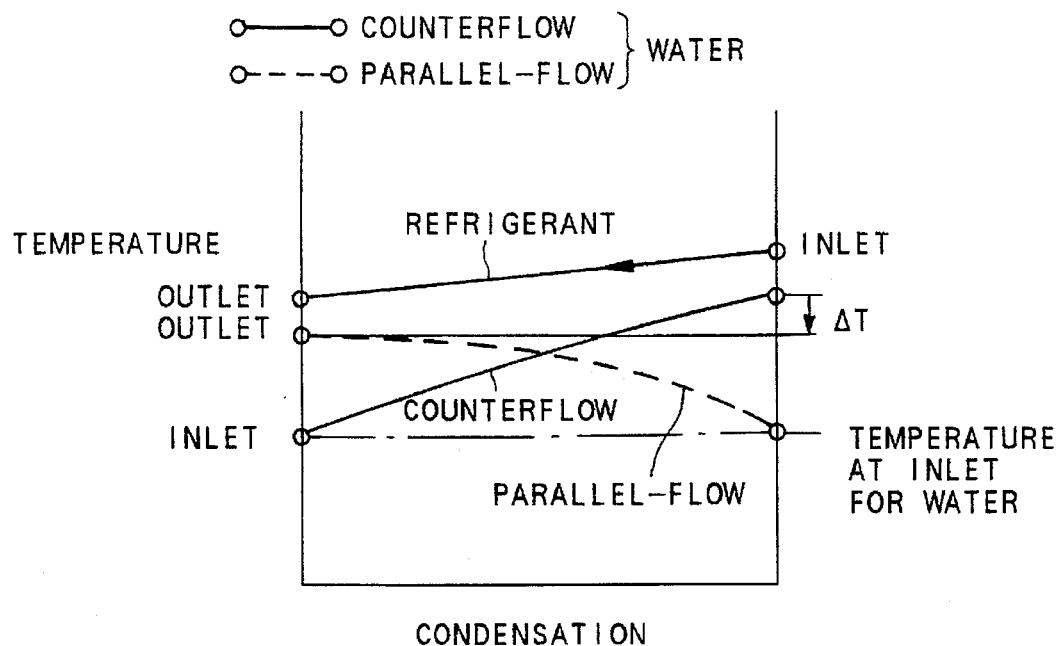
FIG. 9 is a graph showing a performance test result in a condensing process of the counter-flow heat exchanger and the parallel-flow type heat exchanger.
Figure 10:
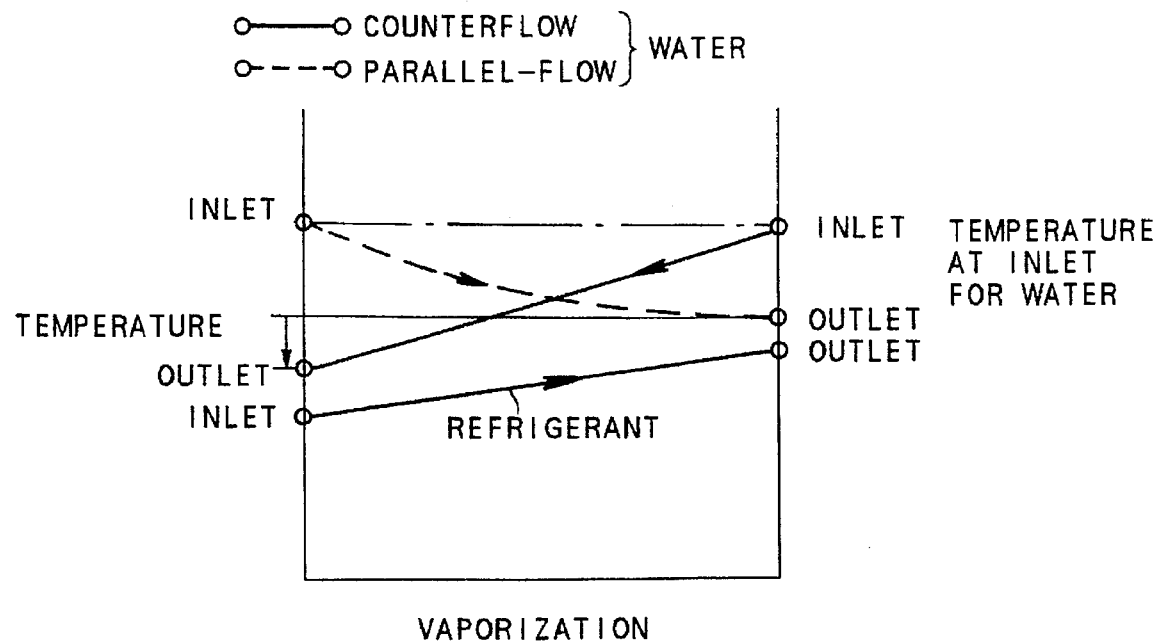
FIG. 10 is a graph showing a performance test result in a evaporating process of the counter-flow heat exchanger and the parallel-flow type heat exchanger.

In this experiment, variation in the temperature difference between the temperature at the inlet side and the temperature at the outlet side of the heat exchanger was observed and compared between the counterflow heat exchanger and the parallel-flow heat exchanger in a condensing process under a condition that the water temperature at the inlet was constant, and it was proved that the temperature difference in the counterflow heat exchanger became greater than that in the parallel-flow heat exchanger as shown in FIG. 9. This result shows that the counterflow heat exchanger has a higher heat-exchange efficiency than the parallel-flow heat exchanger, In this experiment, variation of the temperature difference between the temperature at the inlet side and the temperature at the outlet side of the heat exchanger was also observed and compared between the counterflow heat exchanger and the parallel-flow heat exchanger in an evaporating process under the condition that the water temperature at the inlet was constant, and it was proved that the temperature difference in the counterflow heat exchanger became greater than that in the parallel-flow heat exchanger as shown in FIG. 10. This result shows that the counterflow heat exchanger has also a higher heat-exchange efficiency than the parallel-flow heat exchanger.

Figure 11:
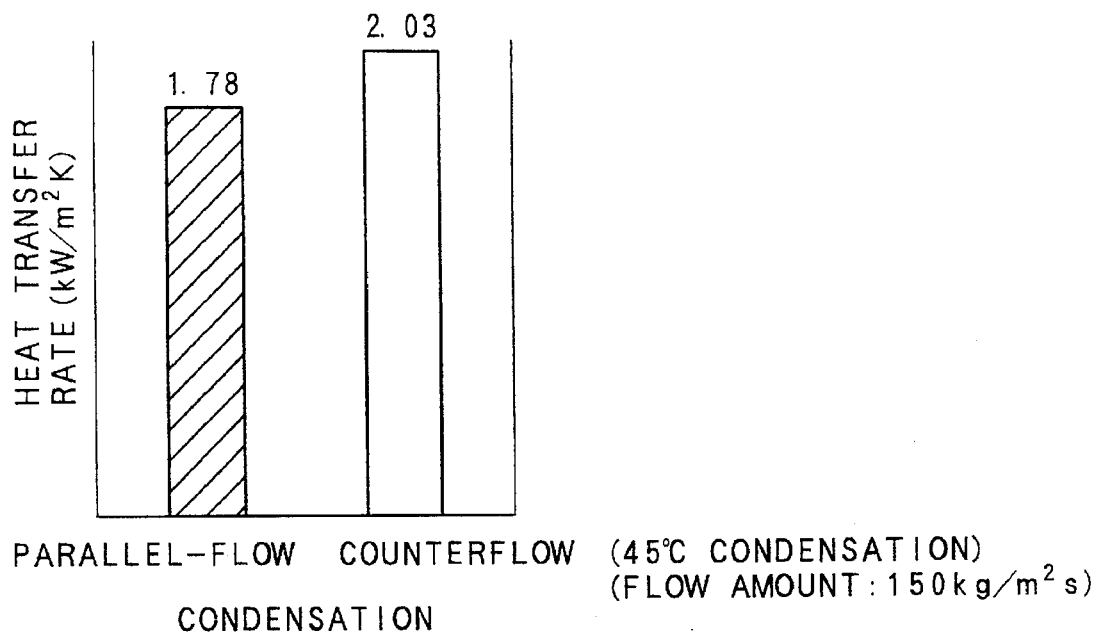
FIG. 11 is a graph showing a heat transfer rate in a condensing process of the counter-flow heat exchanger and the parallel-flow heat exchanger.
Figure 12:
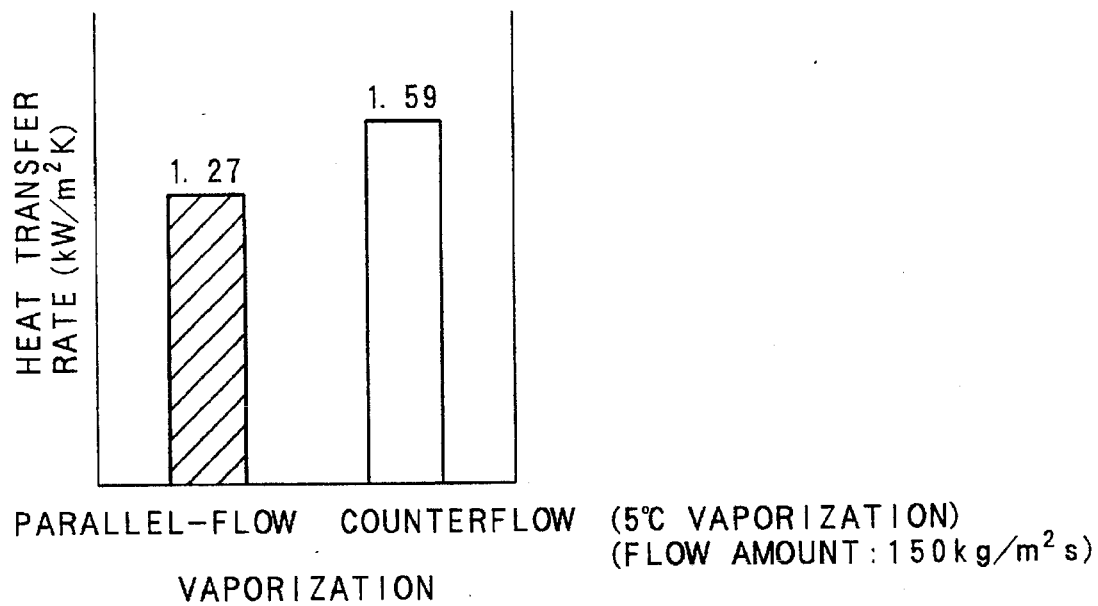
FIG. 12 is a graph showing a heat transfer rate in a evaporating process of the counter-flow heat exchanger and the parallel-flow heat exchanger.

FIGS. 11 and 12 are graphs showing a heat transfer rate in the condensing process and the evaporating process of the counter-flow heat exchanger and the parallel-flow heat exchanger. As shown in FIG. 11, it was proved that the heat transfer rate for the condensing process in the counterflow heat exchanger is higher than that in the parallel-flow heat exchanger by about 14%. Furthermore, as shown in FIG. 12, it was also proved that the heat transfer rate for the evaporating process in the counterflow heat exchanger is higher than that in the parallel-flow heat exchanger by about 25%.

These results are not directly applicable to a fin-tube type air heat exchanger which is used for a general air conditioner, however, it is proved that the counterflow relationship is required in both the cooling operation and the heating operation to improve the performance of the system (coefficient of performance; COP).

According to this embodiment, if the counterflow relationship as described above is once established for the refrigerant flow in the heat exchangers 12 and 15, unlike a conventional air conditioner, the refrigerant flow can be prevented from being reversed through a switching operation of a four-way valve, that is, the refrigerant flow can be prevented from being changed from the counterflow relationship to the parallel-flow relationship through the switching operation of the four-way valve, so that the COP representing the performance of the system can be improved. That is, as shown in the following table 1, as compared with a conventional system (the heat exchanger is set to a counterflow type in the cooling operation), the coefficient of performance in the system of this embodiment becomes higher, particularly in the heating operation because the heat exchanger is set to a counterflow type at all times.

TABLE 1

| | CONVENTIONAL SYSTEM (COUNTERFLOW AT COOL TIME) | | INVENTED SYSTEM (COUNTERFLOW AT HEAT TIME) | |
|---|---|---|---|---|
| | COOL | HEAT | COOL | HEAT |
| POWER (KW) | 2.738 | 4.100 | 2.730 | 4.125 |
| COP | 2.59 | 3.09 | 2.59 | 3.17 |

In the heating operation, the outdoor heat exchanger 15 acts as an evaporator, and thus frost is liable to be induced at the inlet portion thereof for the refrigerant.

However, according to this embodiment, the frosting can be suppressed by disposing the inlet portion of the heat exchanger at the lee side.

Furthermore, this embodiment is also characterized in that the six-way change-over valve 115 is used as a single-structured change-over valve to construct the system. With this construction, the system can be designed in a very simple structure, and the six-way change-over valve 115 can be easily controlled because it can be controlled in a similar control manner to the conventional air conditioner using a four-way change-over valve.

Figure 13:
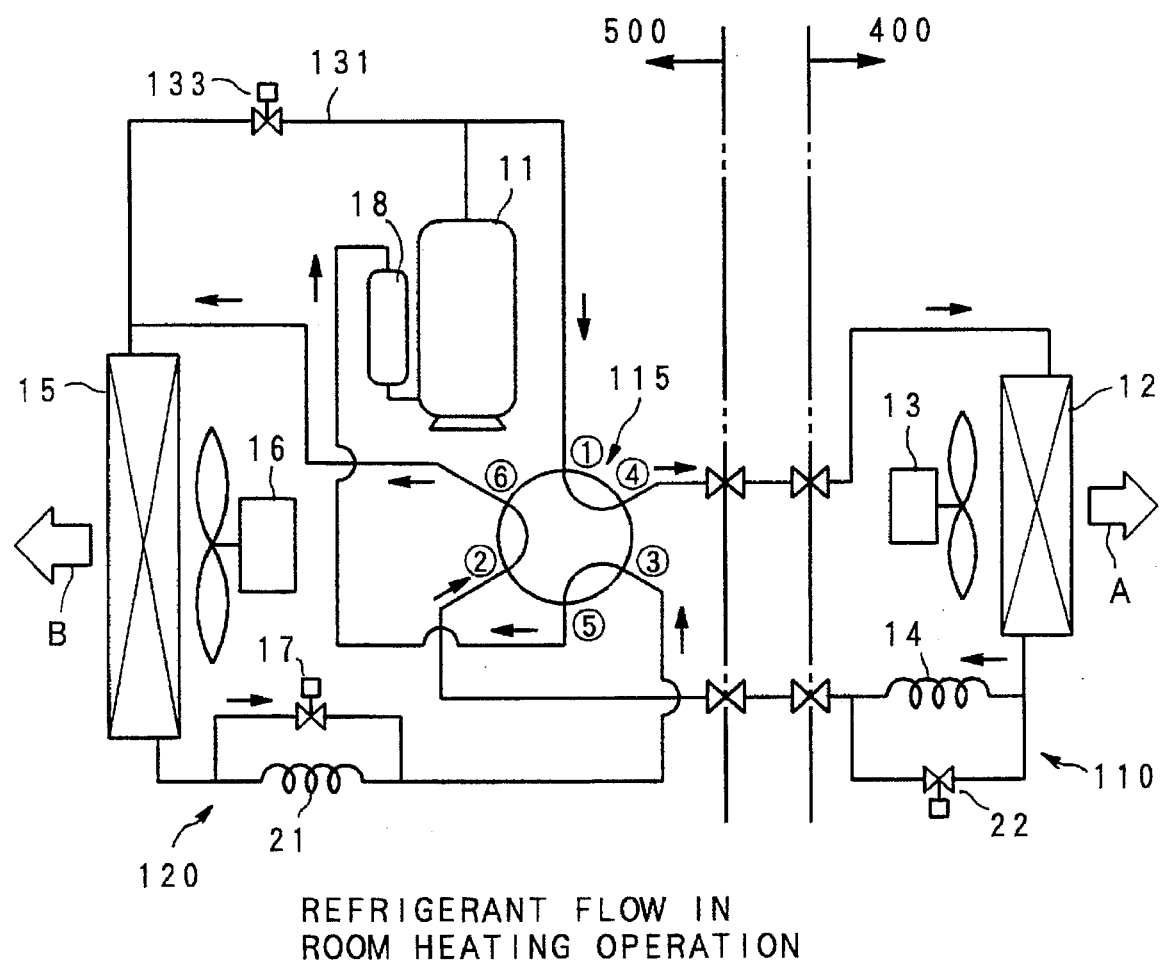
FIG. 13 is a diagram showing a refrigerant circuit of another embodiment of the present invention, particularly when the heating operation is carried out.
Figure 14:
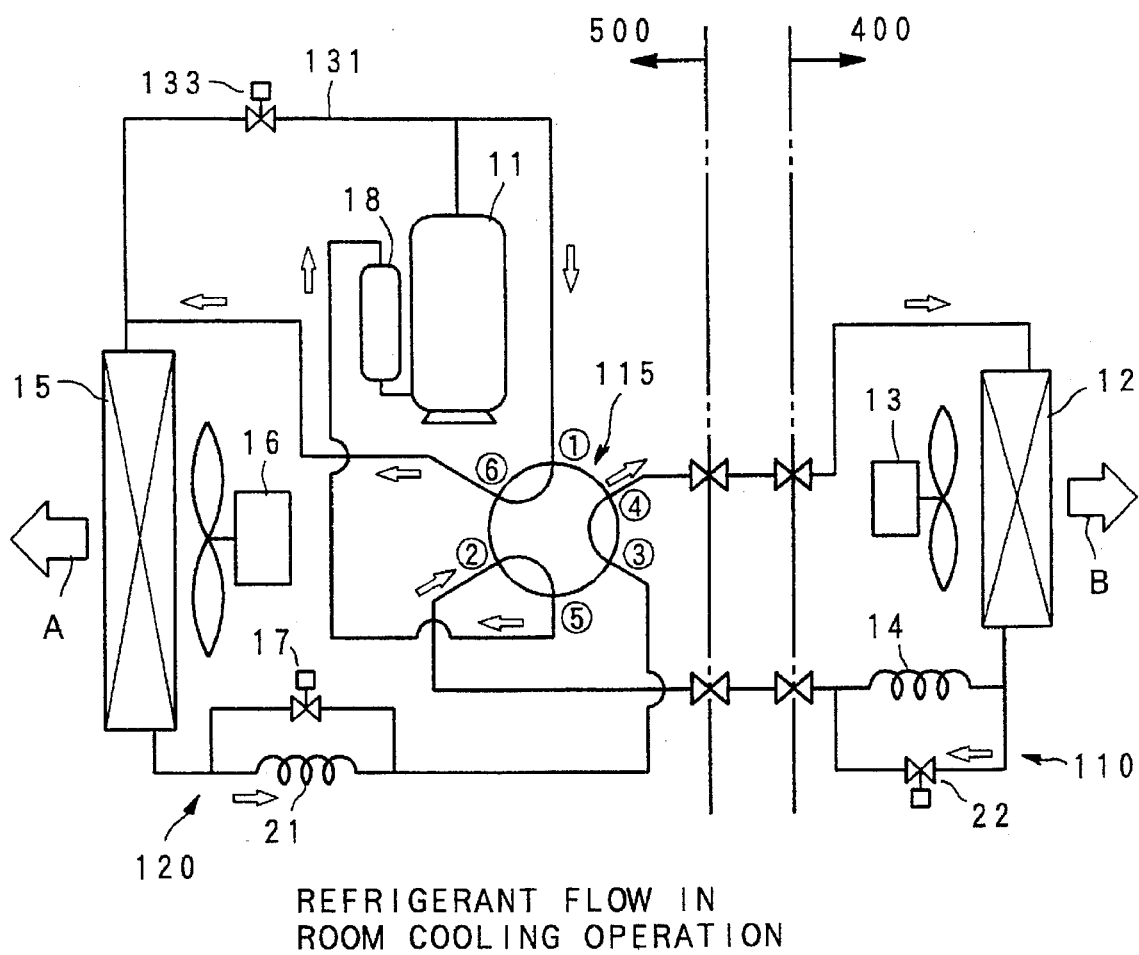
FIG. 14 is a diagram showing the refrigerant circuit of the other embodiment of the air conditioner according to the present invention, particularly when the cooling operation is carried out.

FIGS. 13 and 14 are diagrams showing a refrigerant circuit of another embodiment of the air conditioner using the present invention when the heating operation is carried out and when the cooling operation is carried out, respectively. The different point between the first and second embodiments of the air conditioner resides in the passage structure of the six-way change-over valve 115, and various modifications may be made to the passage structure.

Figure 15:
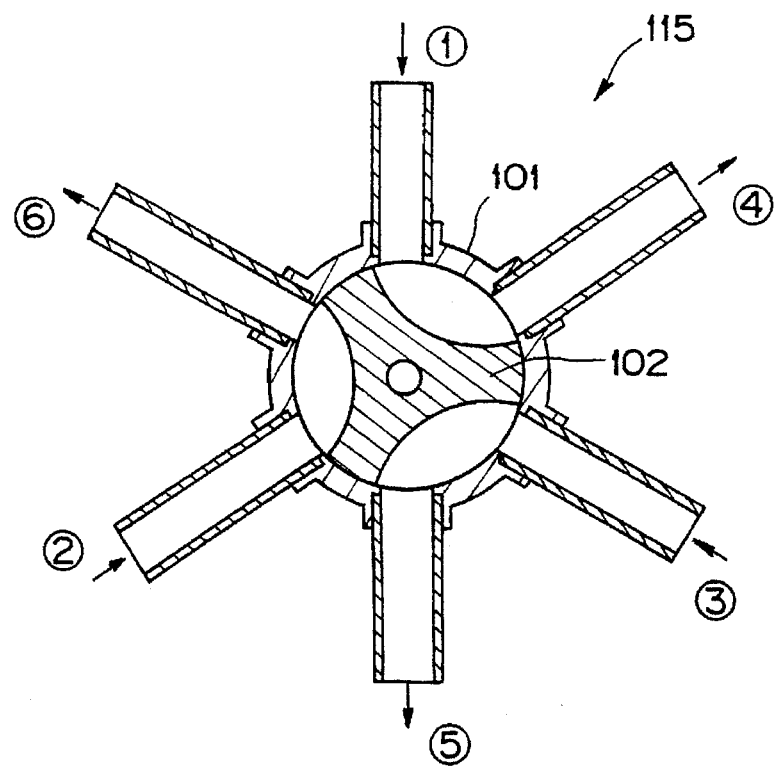
FIG. 15 is a cross-sectional view showing an embodiment of a six-way change-over valve, and shows a switching state of a valve body particularly in the heating operation.
Figure 16:
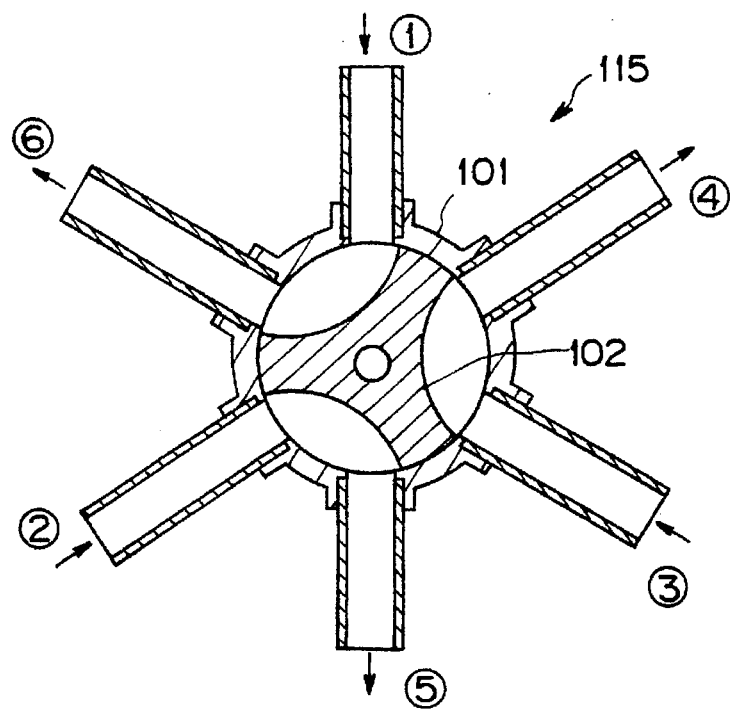
FIG. 16 is a cross-sectional view corresponding to FIG. 15, and shows a switching state of the valve body particularly in the cooling operation.
Figure 17:
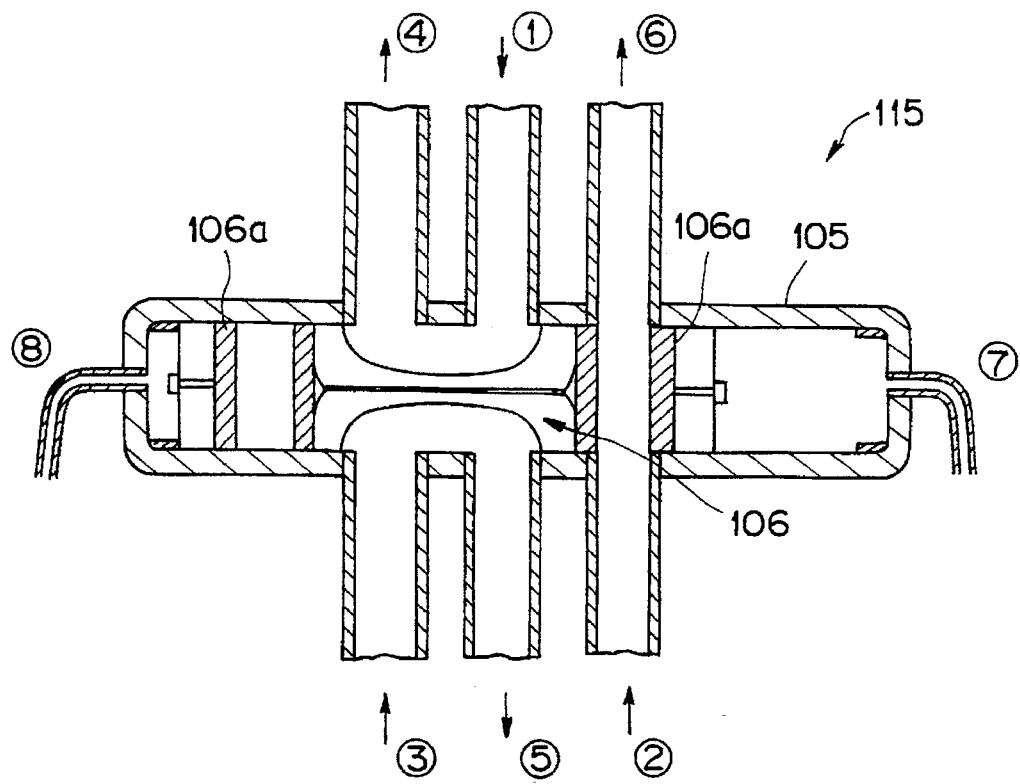
FIG. 17 is a cross-sectional view showing another embodiment of the six-way change-over valve, and shows a switching state of the valve body particularly in the heating operation.
Figure 18:
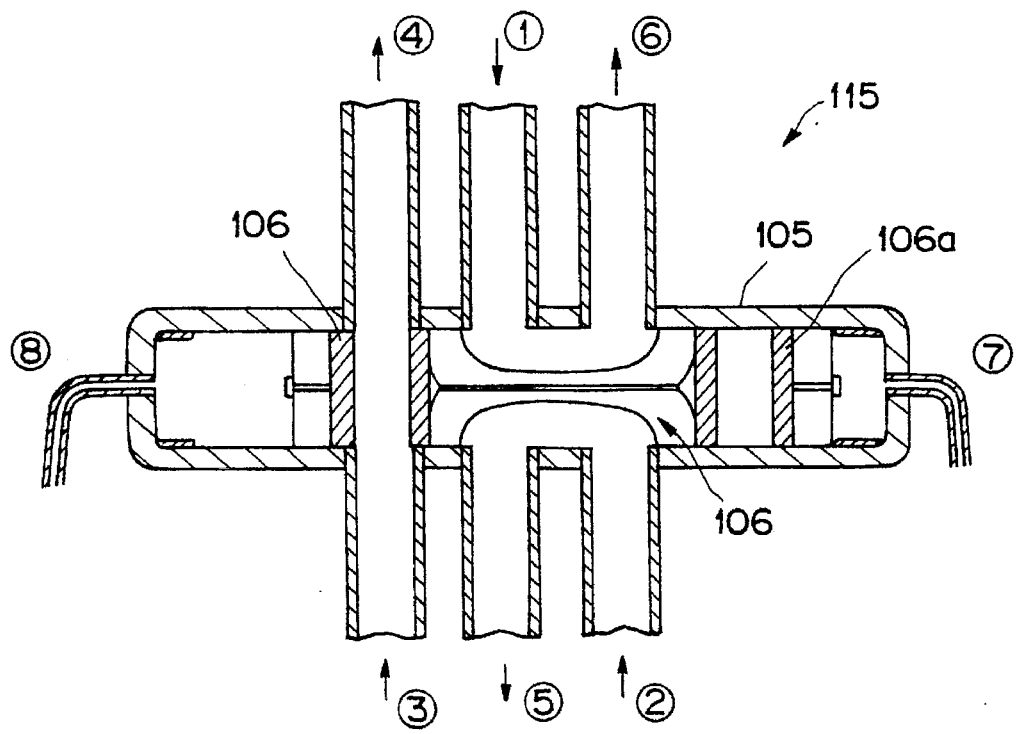
FIG. 18 is a cross-sectional view corresponding to FIG. 17, and shows a switching state of the valve body particularly in the cooling operation.

For example, as the six-way change-over valve 115 may be used a rotational type as shown in FIGS. 15 and 16, a slide type as shown in FIGS. 17 and 18 or the like.

FIGS. 15 and 16 show the rotational type six-way change-over valve, which is used in the refrigerant circuit show in FIGS. 13 and 14. The rotational type six-way change-over valve includes a valve housing 101 and a rotational type valve plug 102, and through rotation of the valve plug 102 in the valve housing 101, respective ports (1) to (6) of the six-way change-over valve intercommunicate with one another as shown in FIGS. 15 and 16. In this case, the inlet port (1) selectively intercommunicates with one of the two outlet ports (4) and (6), the inlet port (2) selectively intercommunicate wit one of the two outlet ports (6) and (5), and the inlet port (3) selectively intercommunicate with one of the two outlet ports (4) and (5).

FIGS. 17 and 18 show the slide type six-way change-over valve, which is used in the refrigerant circuit shown in FIGS.

2 and 3. The slide type six-way change-over valve includes a valve housing 100 and a slide type valve plug 106. The valve plug 106 has linear passage portions 106a for allowing the refrigerant to flow linearly, and the respective ports (1) to (6) intercommunicate with one another as shown in FIGS. 17 and 18 by sliding the valve plug 106 in the valve housing 100 to the right and left in FIGS. 17 and 18. In this case, the inlet port (1) selectively intercommunicates with one of the two outlet ports (4) and (6), the inlet port (2) selectively intercommunicates with one of the two outlet ports (5) and (6), and the inlet port (3) selectively intercommunicates with one of the two outlet ports (4) and (5).

According to this embodiment, by providing the linear passage portions 106a to the valve plug 106, there can be obtained an effect of reducing the resistance of the passage to the flow directing from the inlet port (2) to the outlet port (6) in FIG. 17 and to the flow directing from the inlet port (3) to the outlet port (4) in FIG. 18.

The slide type valve plug 106 shown in FIGS. 17 and 18 is slid to the right and left as follows, For example when operation liquid is supplied from a port (7), the valve plug 106 is slid to the left as shown in FIG. 17. On the other hand, when the operation liquid is supplied from a port (8), the valve plug 106 is slid to the right as shown in FIG. 18.

In both the systems, the six-way change-over valve 115 has the six ports (1) to (6), and the respective ports (1) to (6) are connected to the compressor 11, the indoor heat exchanger 12, the pressure reducers 14 and 21 and the outdoor heat exchanger 15. The port numbers ((1) to (6)) of FIGS. 15 to 18 correspond to the port numbers of the six-way change-over valve 115 shown in FIGS. 2 and 3, respectively.

The present invention is not limited to the above embodiments, and various modifications may be made without departing from the subject matter of the present invention.

According to the air conditioner using the present invention, the refrigerant flowing through the indoor heat exchanger and the outdoor heat exchanger is allowed to flow in the same direction in both the cooling operation and the room heating operation with a simple construction by providing the six-way change-over valve in the refrigerant circuit. The present invention can improve the COP, particularly for an air conditioner using substitute refrigerant such as non-azeotropic mixture refrigerant which has little effect on ozone layer.

What is claimed is:

1. A refrigeration cycle comprising:

a compressor;

an indoor heat exchanger having primary and secondary sides through which refrigerant is supplied and discharged;

an expansion device;

an outdoor heat exchanger having primary and secondary sides through which the refrigerant is supplied and discharged; and a six-way change-over valve for connecting said compressor, said indoor heat exchanger, said expansion device, said outdoor heat exchanger, and said change-over valve to one another so that a refrigeration cycle is established at any time, wherein said six-way change-over valve has a first path for supplying refrigerant discharged from said compressor to any one of the primary side of said indoor heat exchanger and the primary side of said outdoor heat exchanger at any time, a second refrigerant path for returning to said compressor the refrigerant discharged from any one of the secondary side of said indoor heat exchanger and the secondary side of said outdoor heat exchanger at any time, and a third refrigerant path through which one of the secondary side of said indoor heat exchanger and the secondary side of said outdoor heat exchanger from which no refrigerant is supplied to said compressor is allowed at any time to intercommunicate one of the primary side of said indoor heat exchanger and the primary side of said outdoor heat exchanger to which no refrigerant is supplied from said compressor, and said change-over valve serves to selectively switch said refrigerant paths so that the refrigerant passing in said indoor and outdoor heat exchangers flows in the same direction at any time over both heating and cooling refrigeration cycles.

2. A refrigeration cycle as claimed in claim 1, wherein each of said first, second and third paths has an inlet port through which the refrigerant is supplied and an outlet port through which the refrigerant is supplied.

3. The refrigeration cycle as claimed in claim 1, wherein said expansion device comprises a first expansion device which is disposed at the secondary side of said indoor heat exchanger and serves to pass therethrough the refrigerant supplied from said indoor heat exchanger while reducing the pressure of the refrigerant in the heating operation cycle, and to directly pass therethrough the refrigerant supplied from said indoor heat exchanger without reducing the pressure of the refrigerant in the cooling operation cycle, and a second expansion device which is disposed at the secondary side of said outdoor heat exchanger and serves to pass therethrough the refrigerant supplied from said outdoor heat exchanger while reducing the pressure of the refrigerant in the cooling operation cycle, and to directly pass therethrough the refrigerant supplied from said outdoor heat exchanger without reducing the pressure of the refrigerant in the room heating operation cycle.

4. The refrigeration cycle as claimed in claim 3, further comprising:

a first electromagnetic opening and closing valve which is actuated to bypass said second expansion device when the refrigerant discharged from said compressor is supplied to said indoor heat exchanger; and a second electromagnetic opening and closing valve which is actuated to bypass said first expansion device when the refrigerant discharged from said compressor is supplied to said outdoor heat exchanger.

5. The refrigeration cycle as claimed in claim 1, further comprising at least one expansion device disposed on the secondary side of one of the indoor heat exchanger and the outdoor heat exchanger.

6. A refrigeration cycle, comprising:

a compressor;

an indoor heat exchanger;

an expansion device;

an outdoor heat exchanger;

a defrosting circuit including an electromagnetic opening and closing valve which is connected between a discharge side of said compressor and a primary side of said outdoor heat exchanger;

a six-way change-over valve having a refrigerant passage through which refrigerant flows among said compressor, said indoor heat exchanger, said expansion device, and said outdoor heat exchanger, wherein said six-way change-over valve serves to selectively switch the refrigerant passage so that the refrigerant passing in said indoor and outdoor heat exchangers flows in the same direction at any time when the refrigerant cycle is switched to a cooling operation cycle and when the refrigerant cycle is switched to a heating operation cycle and wherein the refrigerant in said defrosting circuit bypasses said six-way change-over valve.

7. The refrigeration cycle as claimed in claim 3, wherein said second reducing unit comprises a capillary tube and an electromagnetic opening and closing valve which is provided in parallel to said capillary.

8. The refrigeration cycle as claimed in claim 1, wherein at least said compressor, said outdoor heat exchanger and said six-way change-over valve are accommodated in an outdoor side unit, and at least said indoor heat exchanger is accommodated in an indoor side unit.

9. A refrigeration cycle having a compressor, an outdoor heat exchanger, an indoor heat exchanger, a first expansion device which is switchable between a validity state and a non-validity state for an expansion action, and a second expansion device which is switchable between a validity state and a non-validity state for an expansion action, comprising:

a six-way change-over valve which is provided with six ports from a first port to a sixth port, and can be selectively set to either a first state where said first port and said fourth port are allowed to intercommunicate with each other, said second port and said sixth port are allowed to intercommunicate with each other and said third port and said fifth port are allowed to intercommunicate with each other, or a second state where said first port and said sixth port are allowed to intercommunicate with each other, said second port and said fifth port are allowed to intercommunicate with each other, and said third port and said fourth port are allowed to intercommunicated with each other;

a first refrigerant pipe for connecting a discharge port of said compressor to said first port of said valve;

a second refrigerant pipe for connecting a suck-in port of said compressor to said fifth port of said valve;

a third refrigerant pipe for connecting an inlet port of said outdoor heat exchanger to said fourth port of said valve;

a fifth refrigerant pipe for connecting an outlet port of said outdoor heat exchanger through said first expansion device to said second port of said valve;

a sixth refrigerant pipe for connecting an inlet port of said indoor heat exchanger to said sixth port of said valve; and a seventh refrigerant pipe for connecting an outlet port of said indoor heat exchanger through said second expansion device to said third port of said valve, wherein said six-way change-over valve is kept to the first state by setting said first expansion device to the validity state and setting said second expansion device to the non-validity state when a cooling operation is performed by said indoor heat exchanger, and kept to the second state by setting said first expansion device to the non-validity state and setting said second expansion device to the validity state when a heating operation is performed by indoor heat exchanger.

10. A refrigeration cycle having a compressor, an outdoor heat exchanger, an indoor heat exchanger, a first expansion device which is switchable between a validity state and a non-validity state for an expansion action, and a second expansion device which is switchable between a validity state and a non-validity state for an expansion action, comprising:

a six-way change-over valve which is provided with six ports from a first port to a sixth port, and can be selectively set to either a first state where said first port and said sixth port are allowed to intercommunicate with each other, said second port and said fifth port are allowed to intercommunicate with each other and said third port and said fourth port are allowed to intercommunicate with each other, or a second state where said first port and said fourth port are allowed to intercommunicate with each other, said second port and said sixth port are allowed to intercommunicate with each other, and said third port and said fifth port are allowed to intercommunicated with each other;

a first refrigerant pipe for connecting a discharge port of said compressor to said first port of said valve;

a second refrigerant pipe for connecting a suck-in port of said compressor to said fifth port of said valve;

a third refrigerant pipe for connecting an inlet port of said outdoor heat exchanger to said fourth port of said valve;

a fifth refrigerant pipe for connecting an outlet port of said outdoor heat exchanger through said first expansion device to said second port of said valve;

a sixth refrigerant pipe for connecting an inlet port of said indoor heat exchanger to said sixth port of said valve; and a seventh refrigerant pipe for connecting an outlet port of said indoor heat exchanger through said second expansion device to said third port of said valve, wherein said six-way change-over valve is kept to the first state by setting said first expansion device to the validity state and setting said second expansion device to the non-validity state when a cooling operation is performed by said indoor heat exchanger, and kept to the second state by setting said first expansion device to the non-validity state and setting said second expansion device to the validity state when a heating operation is performed by indoor heat exchanger.

* * * * *

UNITED STATES PATENT AND TRADEMARK OFFICE
CERTIFICATE OF CORRECTION

PATENT NO. : 5,634,352
DATED : June 3, 1997
INVENTOR(S) : Toshitake NAGAI et al.

It is certified that error appears in the above-indentified patent and that said Letters Patent is hereby corrected as shown below:

On the title page, item: [75], Inventors, change "Ojima-machi" to --Nitta--.  ; Change "Tatebayashi" to --Tatebayashi-shi--; change "Ota" to --Ota-shi--; and change "Oizumi-machi" to --Ora--

Signed and Sealed this

Fourth Day of November, 1997

Attest:

BRUCE LEHMAN

Attesting Officer

Commissioner of Patents and Trademarks